United States Patent

Soules

[15] 3,647,298
[45] Mar. 7, 1972

[54] PULSE CHIRP LASER RANGING DEVICE

[72] Inventor: Jack A. Soules, Cleveland, Ohio

[73] Assignee: The United States of America as represented by the Secretary of the Navy

[22] Filed: Sept. 16, 1969

[21] Appl. No.: 858,477

[52] U.S. Cl. ..................................356/5, 356/4, 343/17.2
[51] Int. Cl. ..............................................G01c 3/08
[58] Field of Search ..................................356/4, 5; 343/17.2

[56] References Cited

UNITED STATES PATENTS

| | | | |
|---|---|---|---|
| 2,524,807 | 10/1950 | Kallmann | 356/4 |
| 3,022,702 | 2/1962 | Pocher | 356/5 |
| 3,325,647 | 6/1967 | Sugier | 356/5 |
| 3,360,987 | 1/1968 | Flower et al. | 356/5 |
| 3,451,059 | 6/1969 | Page | 343/17.2 |

FOREIGN PATENTS OR APPLICATIONS 957,235  5/1964  Great Britain ............................356/4

Primary Examiner—Rodney D. Bennett, Jr.
Assistant Examiner—S. C. Buczinski
Attorney—R. I. Tompkins and Richard J. Miller

[57] ABSTRACT

The invention disclosed in this application concerns itself with a laser echo ranging system utilizing a unique modulator for providing an audio signal corresponding to the distance to the target and a simplified inexpensive method of reading the distances.

5 Claims, 5 Drawing Figures

INVENTOR
JACK A. SOULES
BY
*Richard J. Miller*
ATTORNEY

INVENTOR

JACK A. SOULES

BY

*Richard J. Miller*

ATTORNEY

3,647,298

PULSE CHIRP LASER RANGING DEVICE

The invention described herein may be manufactured and used by or for the Government of the United States for governmental purposes without the payment of any royalties thereon or therefor.

Ranging systems as such are relatively old in the art going back many years to the time of development of radar. As the need for accuracy has increased so has the complexity and cost of equipment to provide it. At the present time the cost of a device runs into the millions of dollars, and are quite complicated, hence, there is a need for producing inexpensive, simple, rugged arranging equipment that is accurate yet does not cost excessive amounts of money.

Therefore, it is an object of this invention to provide an improved laser ranging system.

It is a further object of this invention to provide an improved ranging system incorporating a unique modulator providing a signal through which a pulse is modulated and has an output audio signal which has a frequency corresponding to the distance to the target.

It is yet a further object of this invention to provide an improved laser echo ranging system, comprising, a source of electromagnetic wave radiation for producing monochromatic coherent continuous waves, means for pulse modulating the beam in a programmed manner such as the pulse modulation in a linearly changing amount, means for directing the pulse modulating beam towards a target, means for receiving the directed pulse modulated beam reflected from the target, means for detecting the pulse modulating signal from the reflected beam, means for detecting a portion of the output signal of the pulse modulating means, and means for combining the two detected signals to combine them together to produce an output which has a constant audio signal related to the frequency differences from the echo signal and the locally detected signal.

Other objects, advantages and novel features of the invention will become apparent from the following detailed description of the invention when considered in conjunction with the accompanying drawings wherein:

FIG. 6 is a second pulse train.

Figure 1:
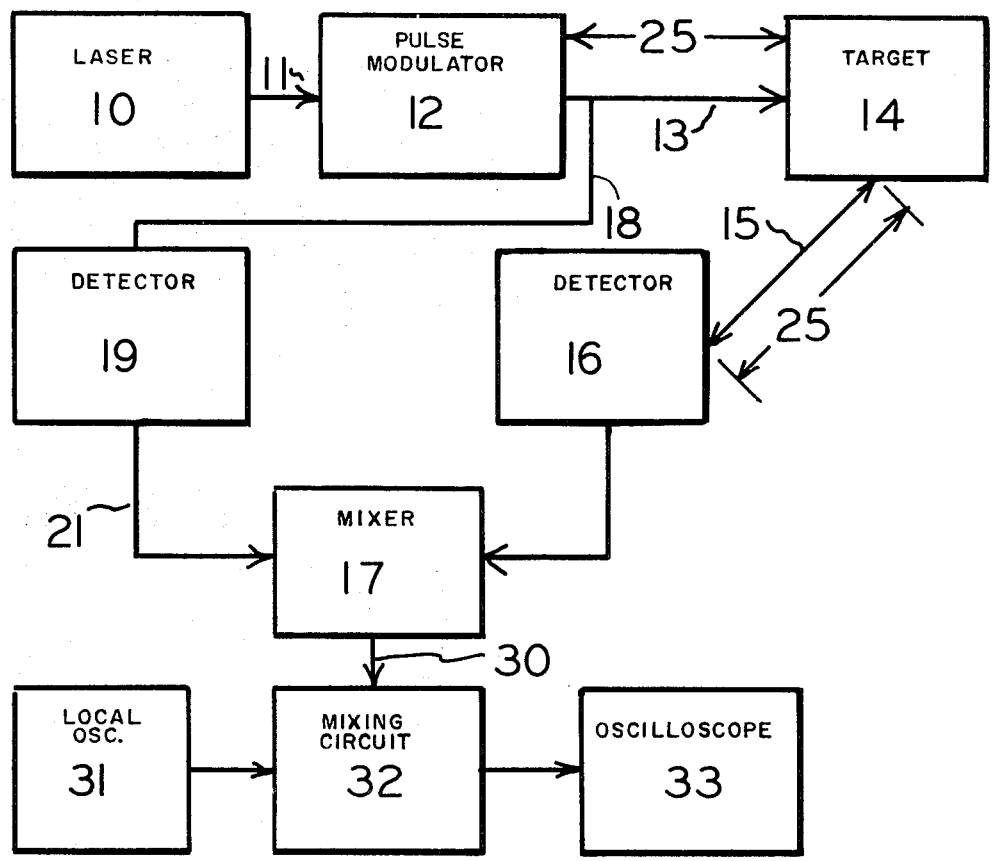
FIG. 1 is a block diagram showing the elements of the invention in their operating relationship.

FIG. 1 is a blocked diagram showing an embodiment of the invention which includes a source of electromagnetic waves radiation 10 which can be any one of a variety of laser devices that will produce a monochromatic coherent beam 11. Beam 11 is in turn fed to the pulse modulator 12 whose specific configuration will be discussed hereinafter. The signal out of the pulse modulator 13 has a configuration shown in more detail in FIG. 2, that is, a pulse train wherein the duration of the pulses or the period of the pulse is varied linearly at an increasing or decreasing rate. A target 14 is encountered by pulse train 13 and a signal is reflected back, shown as 15. It is received by a detector 16 that will generate a signal which is fed to a mixer 17.

A portion of the pulse modulated signal 13, designated as 18, is fed from the modulator 12 to a local detector 19. The output of detector 19 is fed to mixer 20 as indicated by the line 21.

The distance 25 from the modulator 12, represents a duration of time for the travel for the light signal. It should be noted that the travel of signal 13 is represented as being equivalent to the travel of signal back 15. During the time of travel of the light from modulator 12 to target 14 and detector 16, the frequency output of the modulator has changed by an amount represented as hereinafter explained by approximately 250 hertz per 11 microseconds.

Assuming a decreasing pulse modulated signal out of the modulator 12, the signal received by detector 16 will be 250 hertz above the signal received by detector 19 if the distance 25 is approximately 1 mile. These two signals are fed to mixer 17, as shown, and beat together in a typical heterodyning arrangement. The output 30, assuming the above conditions, would be an audio signal of approximately 250 cycles per second that would have a duration of the length of time a signal is reflected back from the target. Such a signal could be detected by a headphone arrangement or, as shown, by a local oscillator audio signal 31 would produce a varying signal which could be fed through a mixing circuit 32 which could be nulled. For instance, signal from an audio generator 31 could be toned to be equivalent to the signal 30 and when the zero point is reached the reading of the generator 31 would be calibrated to show the distance. In an alternate embodiment, the signal could be fed to a reading device 33, such as a cathode-ray oscilloscope in which the signals could be beat to produce either zero or they could be fed to the alternate plates of the CRT and result in a typical well-known pattern.

Figure 4:
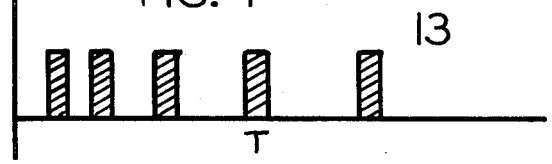
FIG. 4 shows the pulse trains generated by the modulator.
Figure 4:
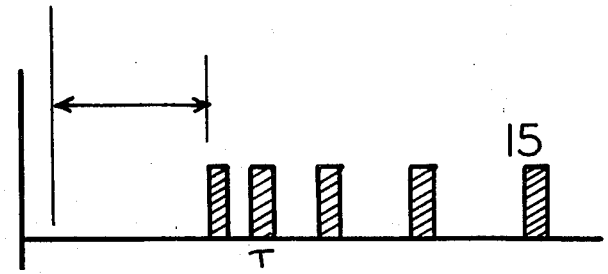
Figure 2:
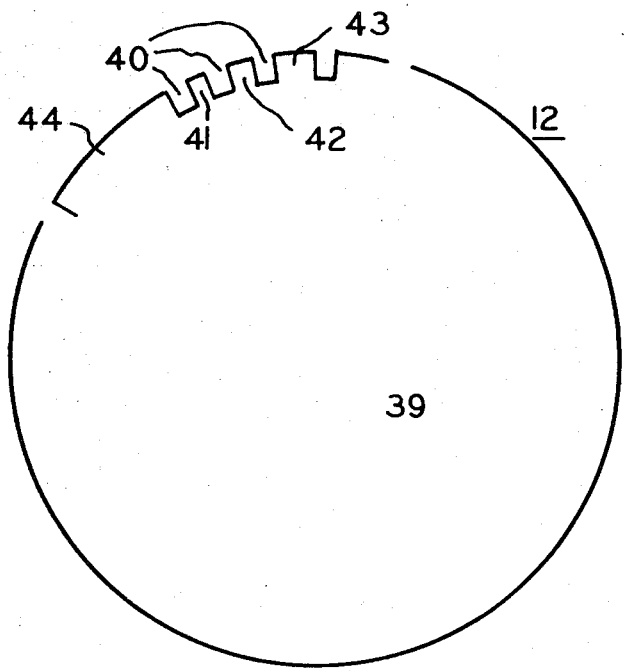
FIG. 2 is an end view of the rotating modulator showing the slot relationship.
Figure 3:
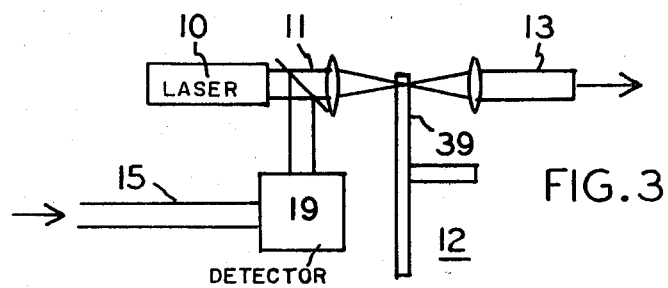
FIG. 3 is a side view of the rotating modulator.
Figure 5:
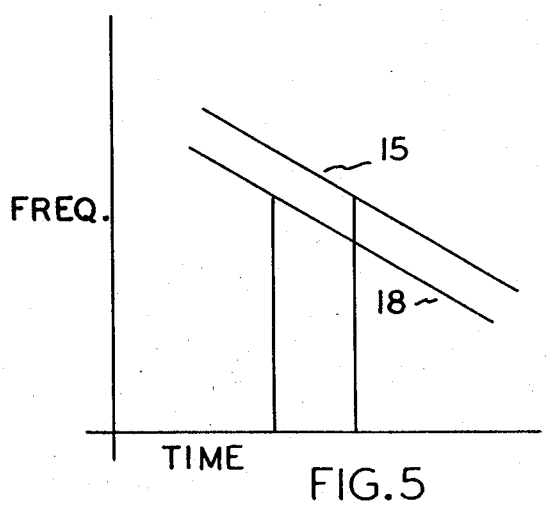
FIG. 5 represents the pulse envelopes of the signals.

FIG. 2 represents one form of modulator device 12, usable with this invention. It is shown as a circular wheel 39 having a plurality of slots 40 positioned about its periphery. These slots are of a uniform width in the embodiment shown but the spaces 41, 42 between the slots are of an increasing size as you go around the wheel. The increase in the embodiment shown is a constant one, that is, the width increases by a fixed amount for each rib between the slot. The light beam 11 is passed through the disc as shown in FIG. 3, and the upper pulse train is generated, as shown in FIG. 4, as 13. Shown is the constant width of the light pulses with an increasing spacing between the light pulses. Portion 44 of the rotating wheel 39, of the modulator 12, is provided for a keying signal to start the operation. FIG. 5 represents the reflected signal 15, received at the detector 16. The commencement of the signal at FIG. 5 represents an elapsed time of 1 microsecond per thousand foot of light travel.

Signal 18 fed to detector 19 continuously will have a frequency, in this embodiment, of a lower rate than that of signal 15 by the amount the wheel has rotated during the passage of the light from the modulator 12 to the target 14 and the detector 16. FIG. 5 represents the two signals received and the difference in the two signals corresponds to the frequency of the signal out of mixer 17, namely signal 30. As the distance to the target increases the spacing between the two signals increases and a higher audio signal is produced.

In one successful embodiment of the invention the rotation of the wheel of modulator 12 was rotated at 7,200 revolutions per minute or 120 revolutions per second. With a 6-inch wheel which has a diameter of approximately 18.84 inches the edge travels at approximately 2,200 inches per second. With a uniform slot width of 0.003 inch and a rib or spacer portion commencing at 0.003 inch and increasing to 0.009 inch the frequency at which the beam 11 is modulated, goes from approximately 376 kilohertz to 188 kilohertz in one rotation of the wheel. Allowing for the keying or initial portion 44 of the wheel and bearing in mind that the distance to the target and back represents a time of travel for the light beam which is approximately 1,000 feet per microsecond, one obtains the figure approximately 250 cycles for each mile from the laser system to the target.

Although the system shown incorporates a rotating wheel which is extremely inexpensive and would maintain its calibration under adversed field conditions, it should be borne in mind that other methods of pulse modulating the laser beam are possible. For example, it would be possible to utilize a movie film through which the light were projected wherein there was alternate light and dark strips which one or the other were increasingly wide. Other methods of modulating the beam as disclosed in this invention readily become apparent.

Obviously many modifications and variations of the present invention are possible in the light of the above teachings. It is therefore to be understood that within the scope of the appended claims the invention may be practiced otherwise than as specifically described.

I claim:

1. An improved laser echo ranging system, comprising:
   a. a source of electromagnetic wave radiation for producing a monochromatic coherent continuous wave;
   b. means for pulse modulating said beam in a programmed manner such that the pulse modulation is changing in a fixed manner by repetitively sweeping the pulse modulation frequency in a linear manner;
   c. means for directing said pulse modulated beam towards a target;
   d. means for receiving said pulse modulated beam reflected from said target;
   e. means for detecting a first pulse modulated signal from said reflected beam;
   f. a detector for detecting a portion of said pulse modulated signal from said pulse modulating means to detect a second pulse modulated signal; and
   g. means combining said first and second detected signals to produce an output which is a constant audio signal related to the frequencies differences from the echo signal and the locally detected signal.

2. The system of claim 1 wherein said means for pulse modulating said beam includes a device for generating a signal which is a series of uniform light pulses spaced from each other in a programmed manner.

3. The device of claim 2 wherein said modulating means is a rotating wheel having uniformly wide slots spaced from each other in a changing relationship.

4. The device of claim 3 wherein said slots are spaced from each other in an increasing distance.

5. The device of claim 4 wherein there is provided a keying slot.